(No Model.)
O. H. P. CORNELIUS & G. H. TURNER.
ALARM SIGNAL FOR HOT JOURNALS.
No. 292,992. Patented Feb. 5, 1884.
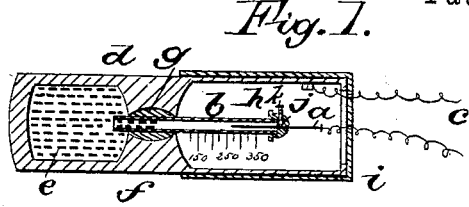
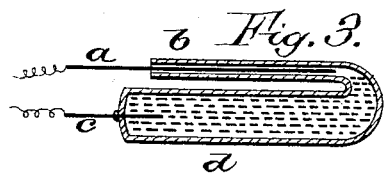
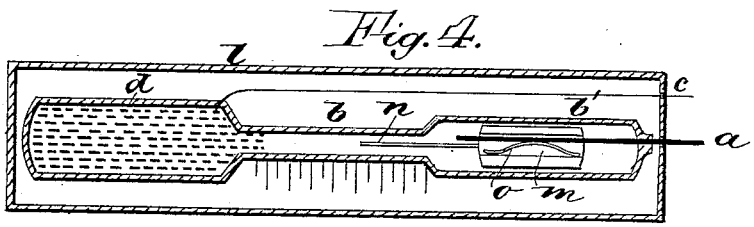
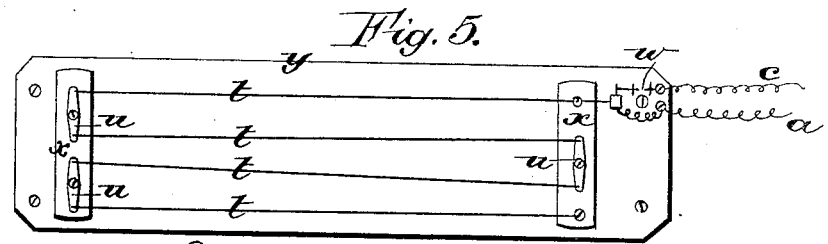
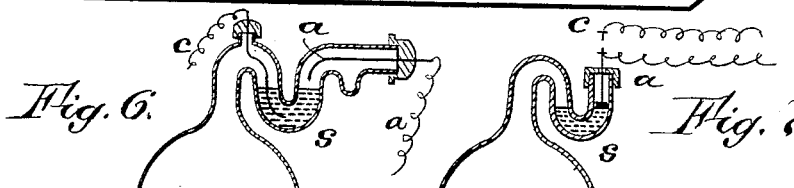
WITNESSES:
H. Hoberger
C. Sedgwick
INVENTOR:
O. H. P. Cornelius
G. H. Turner
BY Munn & Co
ATTORNEYS.

UNITED STATES PATENT OFFICE.

OLIVER H. P. CORNELIUS AND GEORGE H. TURNER, OF TURNER, OREGON.

ALARM-SIGNAL FOR HOT JOURNALS.

SPECIFICATION forming part of Letters Patent No. 292,992, dated February 5, 1884.

Application filed July 6, 1883. (No model.)

*To all whom it may concern:*

Be it known that we, OLIVER H. P. CORNELIUS and GEORGE H. TURNER, both of Turner, in the county of Marion and State of Oregon, have invented a new and Improved Alarm-Signal for Hot Journals, of which the following is a full, clear, and exact description.

Our invention relates to improvements in alarm-signals for hot journals; and it consists in the peculiar construction and arrangement of parts, as hereinafter fully described, and pointed out in the claims.

Reference is to be had to the accompanying drawings, forming part of this specification, in which similar letters of reference indicate corresponding parts in all the figures.

Figures 1 to 4, inclusive, are sectional elevations of different forms of thermometers that may be employed. Fig. 5 represents a side elevation of a pyrometer, and Figs. 6 and 7 are sections of different forms of thermometers.

With a thermometer constructed in any approved way, and suitably placed in contact with a journal-bearing, we propose to connect a wire, $a$, having its point set in the glass tube $b$, the other end of the wire being connected with one pole of a battery; and to the frame or case of the thermometer we connect the other pole of the battery by a wire, $c$, so that whenever the point of wire $a$ is reached by the mercury the circuit will be closed and an alarm-signal will be sounded by means of an electro-magnet and armature suitably placed anywhere along the circuit, and the said thermometer being placed in contact with the journal-bearing, so that when the bearing heats it will heat the thermometer.

The thermometer may be constructed in various ways. For example, a cast-iron case, $d$, having a cell, $e$, for the mercury, may have the tube $b$ inserted through the metallic partition $f$, in which is a cavity, $g$, for reception of cement, by which to secure the tube $b$. Above the partition $f$ is another cell or chamber, $h$, in which the glass tube is inclosed by a cap, $i$, and said tube has a rubber cap, $j$, said cap being not quite air-tight, so that air may enter and escape from the tube as the mercury rises and falls. The tube is to be marked with a scale graduated to the mercury as affected by the heat, and the wire $a$ is to be set therein and secured by a set-screw, $k$, at any point where it is desirable contact shall take place.

In Fig. 2 the glass tube $b$ is represented as having the cell $d$, for containing the mercury, formed on it, and it also has a glass cap at the upper end, through which the wire $a$ enters the tube, which it is preferred in this case shall be an air-tight connection, the interior space of the tube not occupied by the mercury being a vacuum. The wire $c$ in this case connects with the cell $d$, and the thermometer is inclosed by a metallic shell, $l$, in which said thermometer is to be packed with cement or other suitable material for its protection.

In Fig. 3 a glass cell, $d$, is represented, having a tube, $b$, bent up from one end and back along the cell, to receive wire $a$ in its open end, wire $c$ being connected with the other end of the cell.

For a ready means of adjusting the connections, so that the device may be varied when it may be wanted to adjust it for giving the signal at a higher or lower temperature, we propose to enlarge the tube $b$ at $b'$ along the upper end, to enable us to place a shifting block, $m$, on the wire $a$, said block having a wire, $n$, attached to it, to be set toward and from the mercury-bulb $b$, according as it is wanted to make the connection at a higher or lower degree. We make said block to slide freely on the wire $a$, but apply a friction-spring, $o$, to prevent it from shifting by slight shocks, yet being so that when it is desired to shift said block it may be done by sharply striking the end of the inclosing-case $l$.

Another form of thermometer may consist of a hollow spherical bulb, $q$, having a U-neck, $s$, containing the mercury to be made to rise in the right-hand leg of the U by expansion of air by heat in the bulb. In this case the closing of the circuit may be made by contact of the mercury with the wire $a$, or by the raising of the stem of a float into contact with the wire $c$. When we make use of a pyrometer for closing the circuit, we prefer to employ a system of rods, $t$, and levers $u$, so connected that the sum of the movements of all of the wires by expansion, when heated, will take effect on closing the circuit at $w$, the said wires and levers being mounted on insulated metal plates $x$, attached to a board, $y$, that is to be suitably arranged with relation to the place where heat is to be detected for the said wires to be affected by the heat.

While we have referred more particularly to detecting the heat of hot journals, we propose to employ our apparatus for the detection of heat from any source, the object being to provide mills, factories, and other buildings with the means of preventing fires by causing an alarm to be given whenever heat rises to danger-point in any part of the building.

Having thus described our invention, we claim as new and desire to secure by Letters Patent—

1. The combination of the adjusting-block $m$ and wire $n$ with a thermometer, and with the wires of an electric battery arranged for closing the circuit by the effect of increased temperature on the thermometer, substantially as described.

2. The combination, with the bulb $d$, provided with the tube $b$, having the enlargement $b'$, of the block $m$, provided with the wire $n$ and spring $o$, and arranged in the enlargement of the tube, substantially as herein shown and described.

OLIVER H. P. CORNELIUS.
GEORGE H. TURNER.

Witnesses:
M. L. CHAMBERLIN,
GEO. H. BURNETT.